United States Patent [19]
Swerdlow

[11] Patent Number: 5,995,504
[45] Date of Patent: Nov. 30, 1999

[54] DACS NETWORK ARCHITECTURE

[75] Inventor: Richard Swerdlow, Vienna, Va.

[73] Assignee: Lucent Technologies, Inc., Murray Hill, N.J.

[21] Appl. No.: 08/897,457

[22] Filed: Jul. 21, 1997

[51] Int. Cl.$^6$ .............................. H04L 12/50; H04J 3/02; H04J 3/04
[52] U.S. Cl. .......................... 370/360; 370/532; 370/541
[58] Field of Search ................................. 370/360, 532, 370/535, 539, 538, 537, 540, 541, 545, 907, 259, 260, 375; 379/202

[56] References Cited

U.S. PATENT DOCUMENTS

| | | | |
|---|---|---|---|
| 5,040,170 | 8/1991 | Upp et al. | 359/135 |
| 5,436,890 | 7/1995 | Read et al. | 370/58.2 |
| 5,526,359 | 6/1996 | Read et al. | 370/100.1 |
| 5,742,605 | 4/1998 | Norman, Jr. | 370/405 |
| 5,757,793 | 5/1998 | Read et al. | 370/358 |
| 5,781,527 | 7/1998 | Read et al. | 370/216 |
| 5,805,571 | 9/1998 | Zwan et al. | 370/249 |

*Primary Examiner*—Ajit Patel
*Assistant Examiner*—Brian Nguyen

[57] ABSTRACT

A method of controlling multiplexers and cross-connects on a telecommunications network to interconnect DS0 and/or wideband circuits is developed for a test range where a large number of circuits, perhaps several hundred. have to be reassigned every fifteen minutes. However, the method is sufficiently general to work for a variety of telecommunications networks. The method of the invention controls the OC-3 multiplexers and the cross-connects to connect a DS0 or DS1 from any feeder site on the range to a DS0 or DS1 at any other feeder site. In addition to the interconnection of DS0 and DS1 signals, the method includes the control needed to set up conference circuits, where many full duplex circuits (such as two-way voice circuits) are connected together; other one-to-many connections, and simplex circuits where a connection is one-way.

13 Claims, 10 Drawing Sheets

DACS NETWORK ARCHITECTURE

FIELD OF THE INVENTION

The invention pertains to the field of multiplexed telecommunications. More particularly, the invention pertains to methods of controlling multiplexers and cross-connects on a telecommunications network.

BACKGROUND OF THE INVENTION

It is often necessary to route data across a multiplexed network comprising many sources and destinations of many kinds of information. Such information could be a digitized audio conversation between two telephones (termed "duplex" or two-way communications), a data stream from a sensor to a data recorder or computer ("simplex" or one-way transmission), or a transmission from one location to a number of displays (a "multicast"). Several users could be connected together in a conference call setup.

The most common digitization technique is pulse code modulation (PCM). In telephone audio usage this involves taking 8000 samples/second of the analog waveform and quantizing it to 8 bit precision with an analog to digital (A/D) converter. When the bits are serially shifted out, the signal source is called a "DS0", in the North American telecommunications terminology. The "DS0" terminology refers to a well-defined transmission rate and coding scheme in the time-division multiplex hierarchy. The term DS0 generally applies to the 64 Kb component of a DS1 signal that represents the equivalent of a voice channel. Digital signal rates and signal templates are documented by industry standards organizations such as the American National Standards Institute (ANSI), the Conference of European Postal and Telecommunications Administrations, and the CCITT. Examples of the North American digital hierarchy include DS1 (operating at 1.544 Mb/s per second), DS1 C (3.152 Mb/s), and DS3 (44.736 Mb/s). Four DS1's can be combined into a DS2; δDS2's compose a DS3. There are also DS4's and DS5's, used for long-distance trunks often running on optical fiber.

A Digital Cross-Connect System (DCS) is a network element that terminates digital signal systems at a particular bit rate, but allows the direct interchange of component signals at a lower bit rate. A DCS 1/0, for example, terminates DS1 systems and interchanges DS0 bit rate channels. A DCS 1/1 interchanges DS1 bit rate channels. A DCS 3/1 has a DS1 interchange, but also allows a DS3 level interface which is demultiplexed to DS1 for switching. A DCS 3/3 has both a DS3 interface and DS3 cross-connect.

A Digital Access Cross-Connect System (DACS) is an electronic digital cross-connect system manufactured by Lucent Technologies Network Systems that has the capability to rearrange the digital signal components of a particular transmission rate. For example, the DACS IV-2000 System is a DS1 cross-connect, and the DACS III-2000 is a DS3 cross-connect.

A Synchronous Optical Network (SONET) is a set of standards for transmission systems operating over optic fiber. The SONET standard is based on the DS3 signal with added bits for overhead information, etc. The basic building block is the Synchronous Transport Level-1 (STS-1) or the Optical Carrier Level-1 (OC-1) at 51.84 Mb/s. The standard provides for higher bit-rate transmission of STS-n and OC-n, where n=1,3,9,12,18,24,36,48.

The particular layout (or "range") within which the method of the invention will be described is shown in FIG. 1. It will be understood that this particular layout is provided for example only, and the method of the invention is not limited to any specific network layout.

Locations or nodes with electronic cross-connects are called main sites (1), and these sites are interconnected with fiber optic (SONET) multiplexers (2). The distances between these sites may be tens of miles apart and the network may have many more sites than are shown here. The sites are connected by links (8), which might be optical, wired, radio, satellite or microwave, as desired. The overall network can be configured as a ring, as shown by links (8), and possibly by secondary links between high-traffic locations, as shown by diagonal link (9).

Most of these multiplexers (see, for example, SONET (3) (FIG. 2) have connections to smaller sites called "feeder sites" (6) that connect to the DS0 (7) and wideband signals at those sites that need to be interconnected across the range. A multiplexer (3) (FIG. 2) that connects to one or more feeder sites is called a breakout site. Main sites may also function as breakout sites.

FIG. 2 shows a detail of a main site (1) and a breakout site (3), with the interconnections among the various devices. The sites connect to the main network (18) with its amplifier/repeater (19) through SONET OC-48 multiplexers (13a–b).

In each of the sites, one or more feeder sites (11a–c), which communicate with their users via DS0-level signals (12a–c), are connected to SONET OC-3 multiplexers (17a–b) via DS1 signals (10a–c). In the main site (1), the OC-3 (17a) is connected to a DCS 3/1 digital cross-connect (14) which in turn is connected via DS3 lines (15) to a DCS 1/0 cross-connect (16). In the breakout site, the OC-3 multiplexer (17b) connects directly to the OC-48 multiplexer (13b).

In a breakout site (3), the DS1 signals (10b–c) from the feeder sites (11b–c) are "hard wired" to the OC-3 SONET multiplexer (17b), but these multiplexers can change the locations of these DS1 signals within the OC-3 multiplexer electronically.

Similarly, in a main site (1) the digital cross-connects DCS 3/1 (14) and DCS 1/0 (16) can change the location of DS0 (12a) and DS1 (10a) signals within the DS3 signals (20) that are connected to the OC-48 multiplexer (13a). The DS1 to be cross-connected does not have to have a DS0 within it. An entire "clear channel" DS1, i.e., no channelization for DS0 circuits, can be cross-connected.

SUMMARY OF THE INVENTION

The method described here controls multiplexers and cross-connects on a telecommunications network to interconnect DS0 or wideband circuits. The method was developed for a test range where a large number of circuits, perhaps several hundred, have to be reassigned every fifteen minutes. However, the method is sufficiently general to work for a variety of telecommunications networks.

The method of the invention controls the OC-3 multiplexers and the cross-connects to connect a DS0 or DS1 from any feeder site on the range to a DS0 or DS1 at any other feeder site. Besides the interconnection of DS0 and DS1 signals, the method includes the control needed to set up conference circuits, where many full duplex circuits (such as two-way voice circuits) are connected together; other one-to-many connections- and simplex circuits where a connection is one-way.

DESCRIPTION OF THE PREFERRED EMBODIMENT

Figure 9:
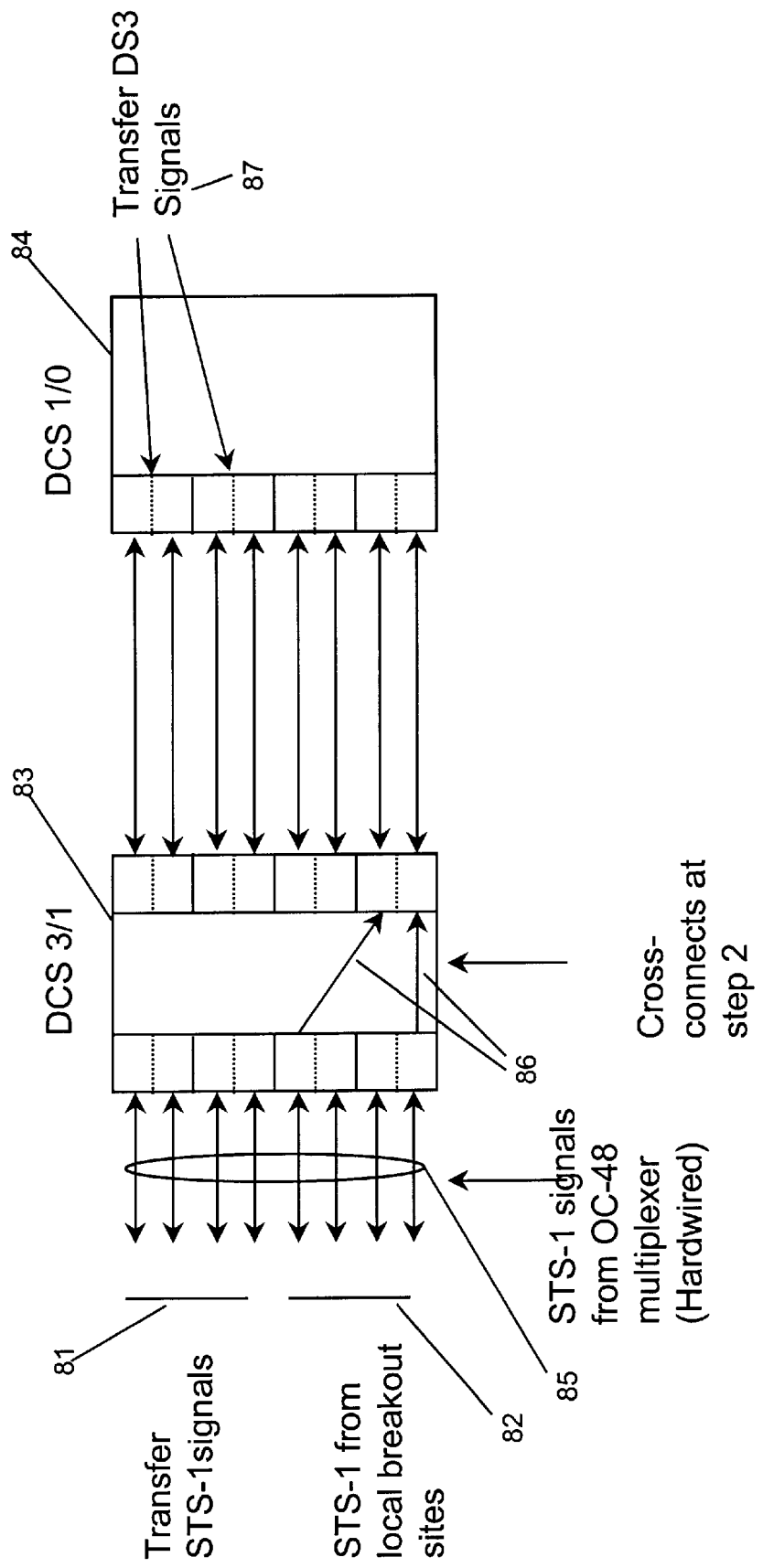
FIG. 9 shows the DCS 3/1 and DCS 1/0 interconnections from step 2 of the invention.
Figure 10:
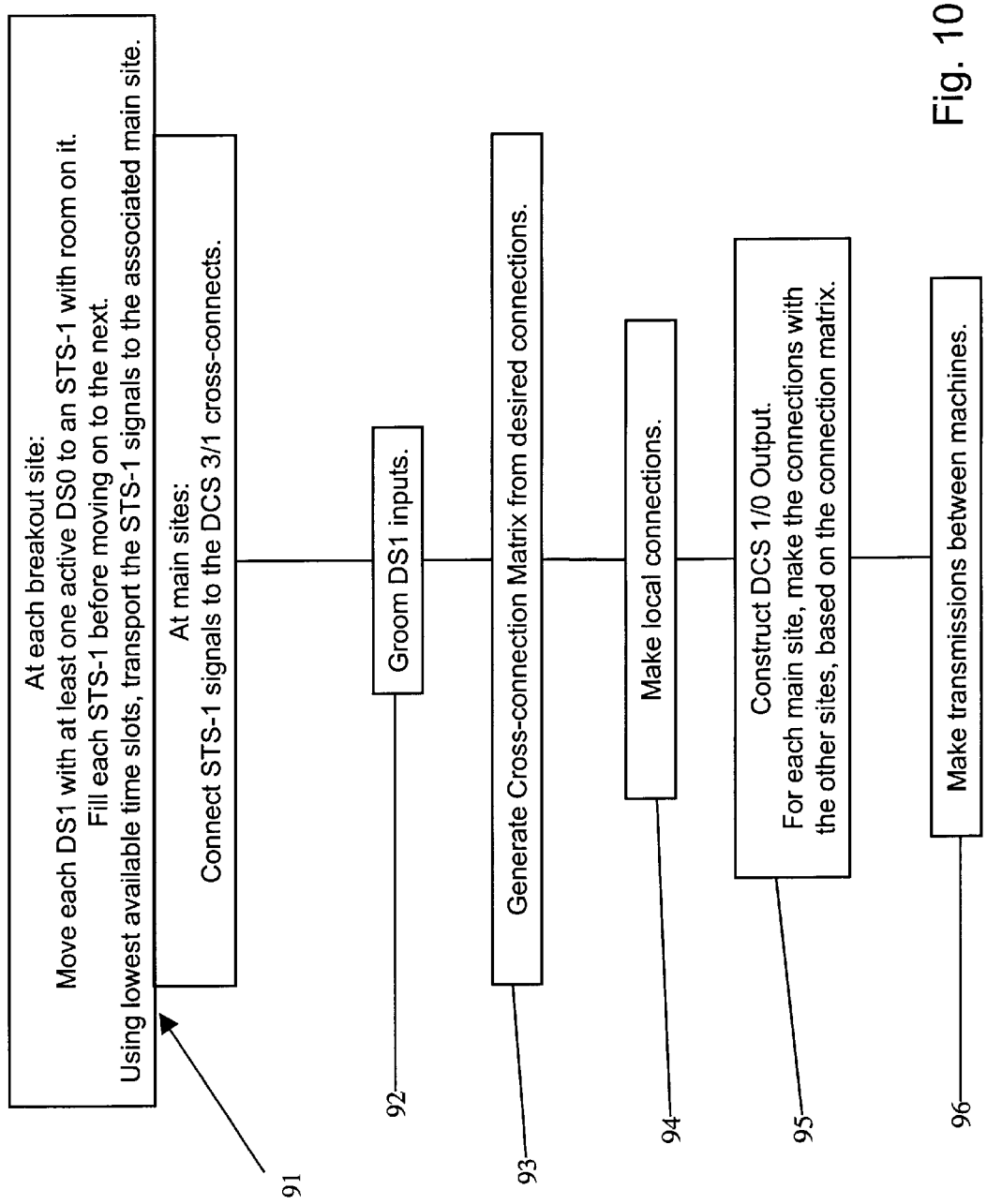
FIG. 10 is a flowchart of the method of the invention.

The method of the invention is in six steps, as shown in the flowchart of the method of the invention of FIG. 10. FIGS. 3 through 9 show details of the interconnections developed during the method of the invention, in a simplified example network.

Transport to Main Sites (91)

Figure 1:
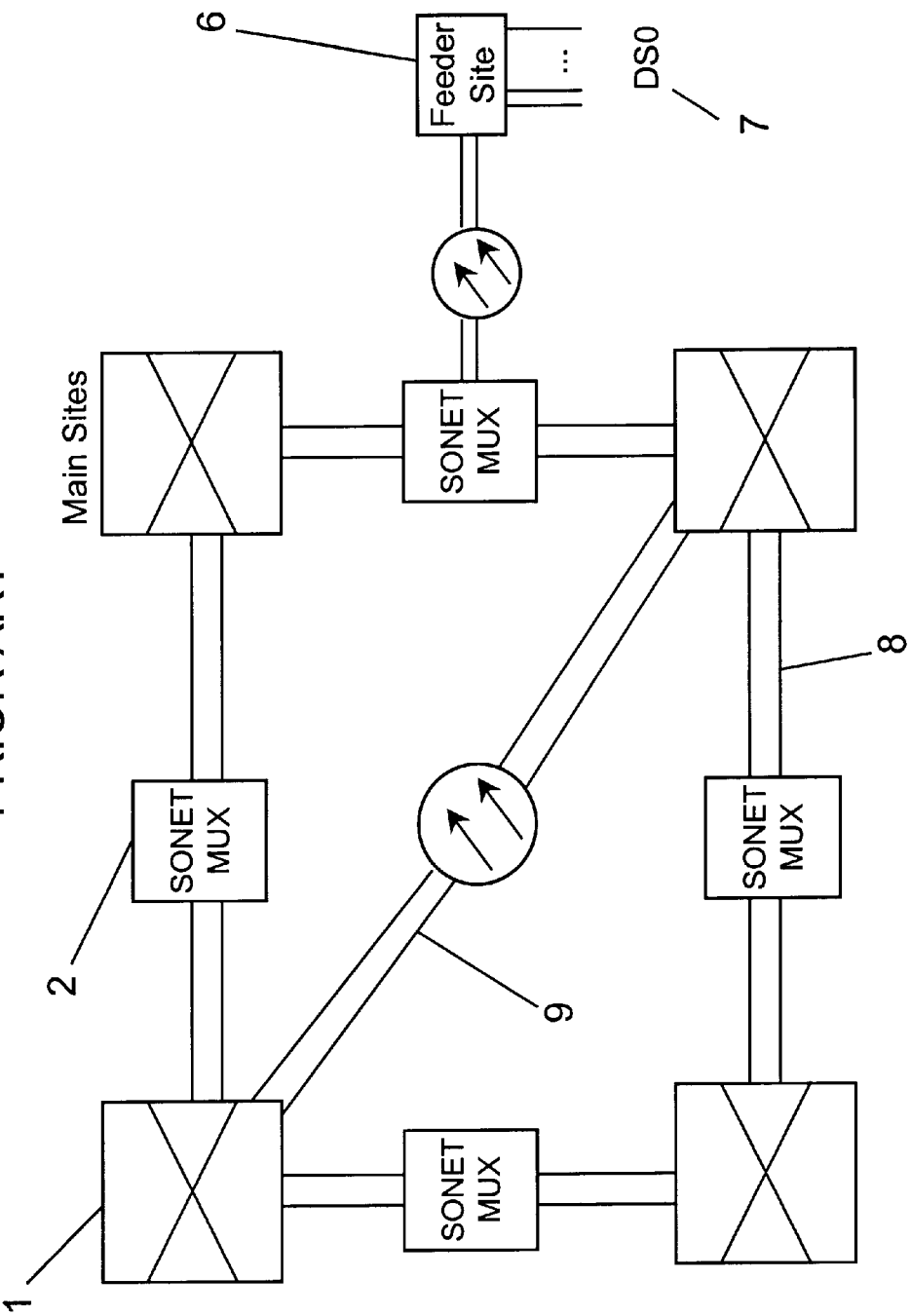
FIG. 1 shows the architecture of a typical network within which the method of the invention may be used.
Figure 2:
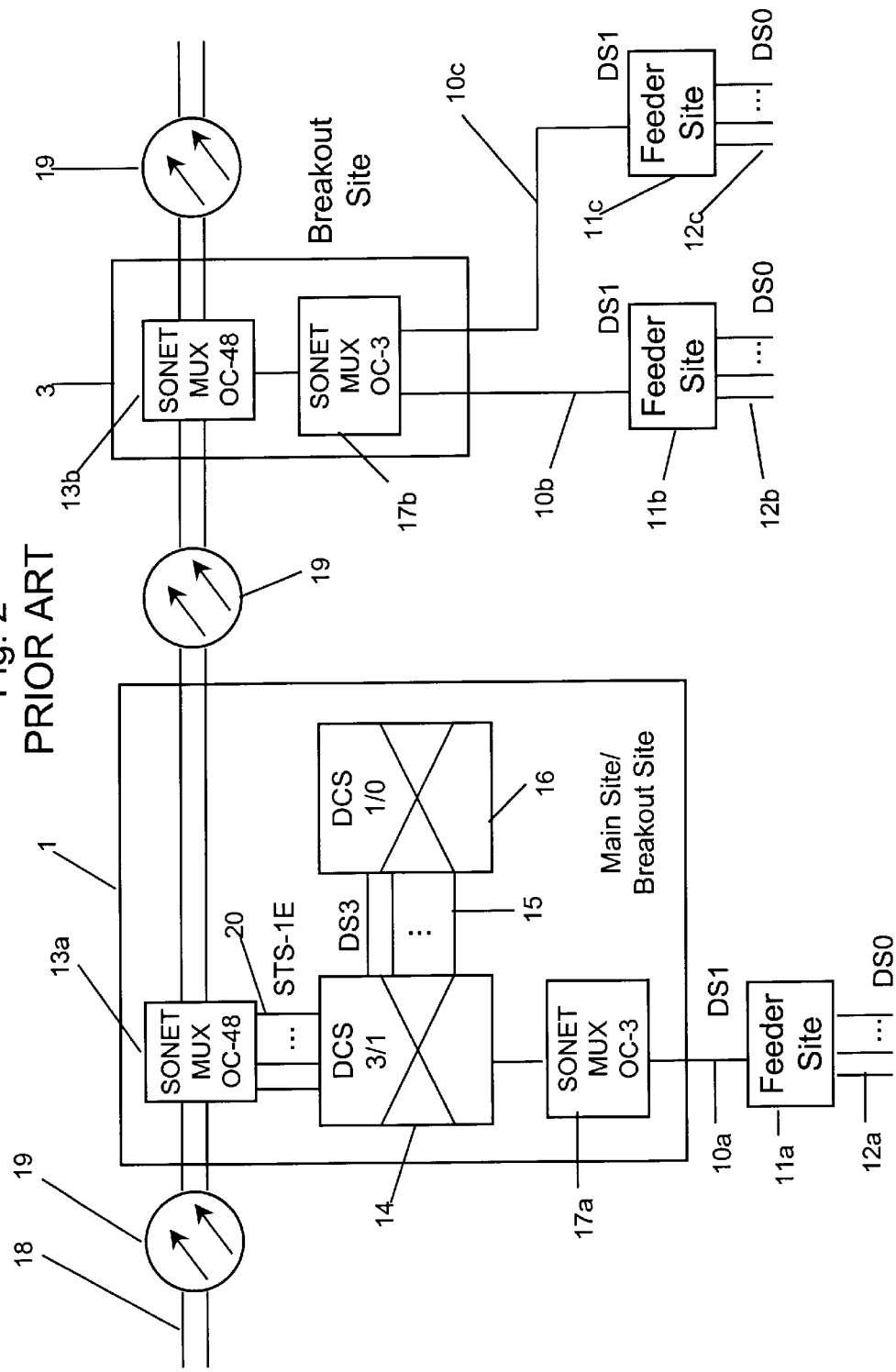
FIG. 2 shows details of main and breakout sites on the network of FIG. 1.

A range configuration is a statement of which signals at the feeder sites are connected together. The feeder (6) and breakout (3) sites may have DS0, DS1, and DS3 signals for data gathering that are to be connected into the range system for interconnection at other points on the range. For example, a DS0 (12a) at the left-most feeder site (11a) on FIG. 2 may have to be connected to a DS0 (12c) at the right-most feeder site (11c) on the figure. The description here will use DS0 signals, but the procedure is similar for DS1 and DS3 signals.

Each breakout site (3) must be assigned to a main site (1). This is done during design of the system prior to range configuration. The first step in the method is to bring all the signals carrying information from the breakout sites back to the cross-connect machines DCS 3/1 (14) and DCS 1/0 (16) at the main sites (1).

The goal of this step is to pack as many DS0 signals (12a–c) from the feeder sites (11a–c) on the STS-1 signals (20) on the OC-48 multiplexers (13a–b) at the breakout sites so as to use the fewest number of time slots on the multiplexers.

Each feeder site brings a whole DS1 back to the breakout site, and the DS1 signals (10a–c) from each feeder site (11a–c) are "hardwired" to the OC-3 multiplexers (17a–b). Using the electronic cross-connect feature of the SONET multiplexers (17a–b), move each DS1 with at least one active DS0 to an STS-1 with room on it at that site. Fill each STS-1 before moving to the next.

Use the lowest available time slots on the OC-48 multiplexers at the breakout sites to transport these STS-1 signals back to the associated main site.

At the main site (1), these STS-1 signals are connected to the DCS 3/1 cross-connects as shown in FIG. 9. At this point, every active DS0 within an STS-1 (82) from the breakout sites has a location on some one of the ports on the DCS 3/1 (83) as shown in the Figure.

Groom DS1 Inputs (92)

Each STS-1 signal from the breakout sites (82) may have very few active DS1 signals. In this step, the active DS1 signals within the STS-1 signals from the local breakout sites (82) and transfer STS-1 signals (81) are groomed, that is, moved (86) to fill a smaller number of DS3 signal ports that are connected to the DCS 1/0 cross-connect (84). This number is selected during the design phase of the system. This reduces the number of DS3 ports required for the DCS 1/0 cross-connect.

The Signal Cross-connect Matrix (93)

Figure 3:
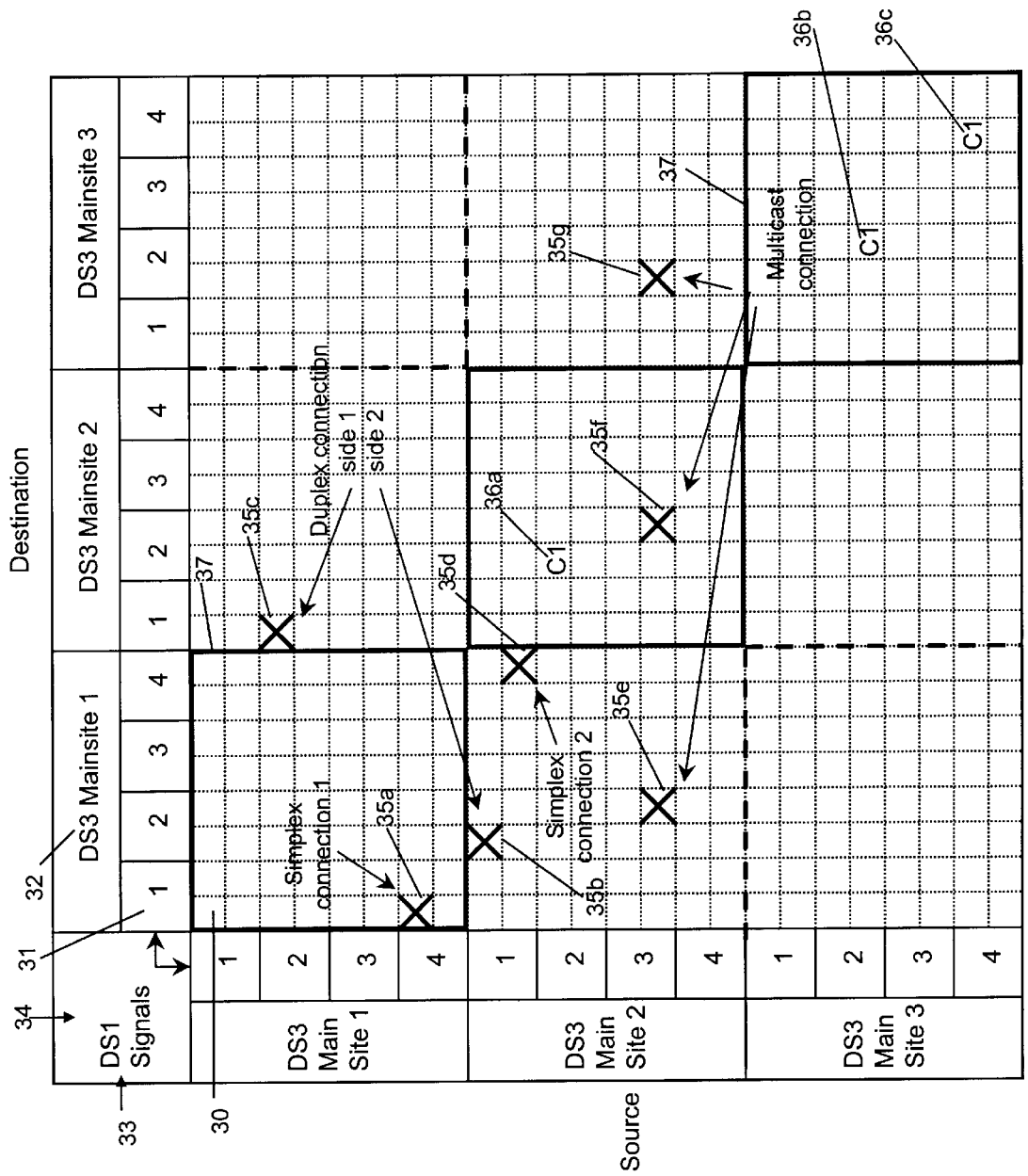
FIG. 3 shows is a matrix showing the signals to be cross-connected in the example described in the preferred embodiment, as developed in step 3 of the invention.

At this point, each DS1 that is active is within a DS3 that is connected to the DCS 1/0, and the known association of DS0 signals at the feeder sites to the DS1 signals at the DCS 3/1 produces a Signal Cross-connect Matrix. FIG. 3 shows such a matrix for an example network of three main servers.

FIG. 3 illustrates how cross-connect instructions are developed from the connections that are desired on the network. This figure represents DS3 signals connected to the DCS 1/0 machines at each of the main sites. In this case, three such DCS 1/0 machines are shown for example purposes, but it will be understood that any number of machines may be used in a real-world network.

Looking across the top of the figure, the spaces (30) between the dotted lines represent DS0 signals. The larger blocks (31) represent DS1 signals—for clarity of presentation only two DS0 signals have been shown for each DS1 and only four DS1 signals have been shown for each DS3 signal. In actuality, the standard provides for up to 24 DS0 signals within each DS1, and 28 DS1's within each DS3. Again for clarity, only one DS3 (32) is shown for each main site, but many more could be provided as required by the traffic load on the network.

Signals shown across the top of the figure (33) represent signal destinations; the signals shown down the side (34) are sources. An "X" (35a–g) represents a signal connection, either simplex connections (35a, 35d), one side of a duplex connection (35b–c), or a "one to many" multicast (35e–g). A "C" with a numeral represents a conference connection (i.e. "C1" (36a–c).

For example, the source of the first simplex (one way) connection (35a) is, reading horizontally, the first DS0 on the fourth DS1 on the DS3 at Site 1 and its destination is the first DS0 on the first DS1 on the DS3 at Site 1.

A duplex connection has two sides for each direction of transmission. The source for side 1 of the duplex connection (35b) is, reading horizontally, the first DS0 within the second DS1 on the DS3 at site 1, and its destination, reading vertically, is the first DS0 within the first DS1 on the DS3 at site 2. The source for the second side of the duplex connection (35c) is the first DS0 within the first DS1 on the DS3 at site 2; and its destination, reading vertically, is the first DS0 within the second DS1 on the DS3 at site 1. The two separate connections of a duplex connection show as symmetric about the main diagonal of the figure.

Marks on the diagonal (36a–c) represent conference connections Cn, and the numeral "n" denotes the particular conference. There is one conference connection shown ("C1") and the first leg (36a) is on the first DS0 of the second DS1 on the DS3 at site 2; while the other two legs (36b–c) are on the DS3 at site 3.

Multicast connections (35e–g) have the same source and more than one destination as shown in the Figure. The multicast source in the example is the second DS0 on the third DS1 on the DS3 at Site 2, and it connects to the second DS0 on the second DS1 at the DS3 at Site 1 (35e), the second DS0 on the second DS1 at Site 2 (35f), and the first DS0 on the second DS1 at Site 3 (35g).

Make Local Connections (94)

DS3 signals on the diagonal of FIG. 3, shown in heavy outline (37), are connections within the same machine, so that the cross-connect instructions for these connections can be read directly off the chart.

Figure 4:
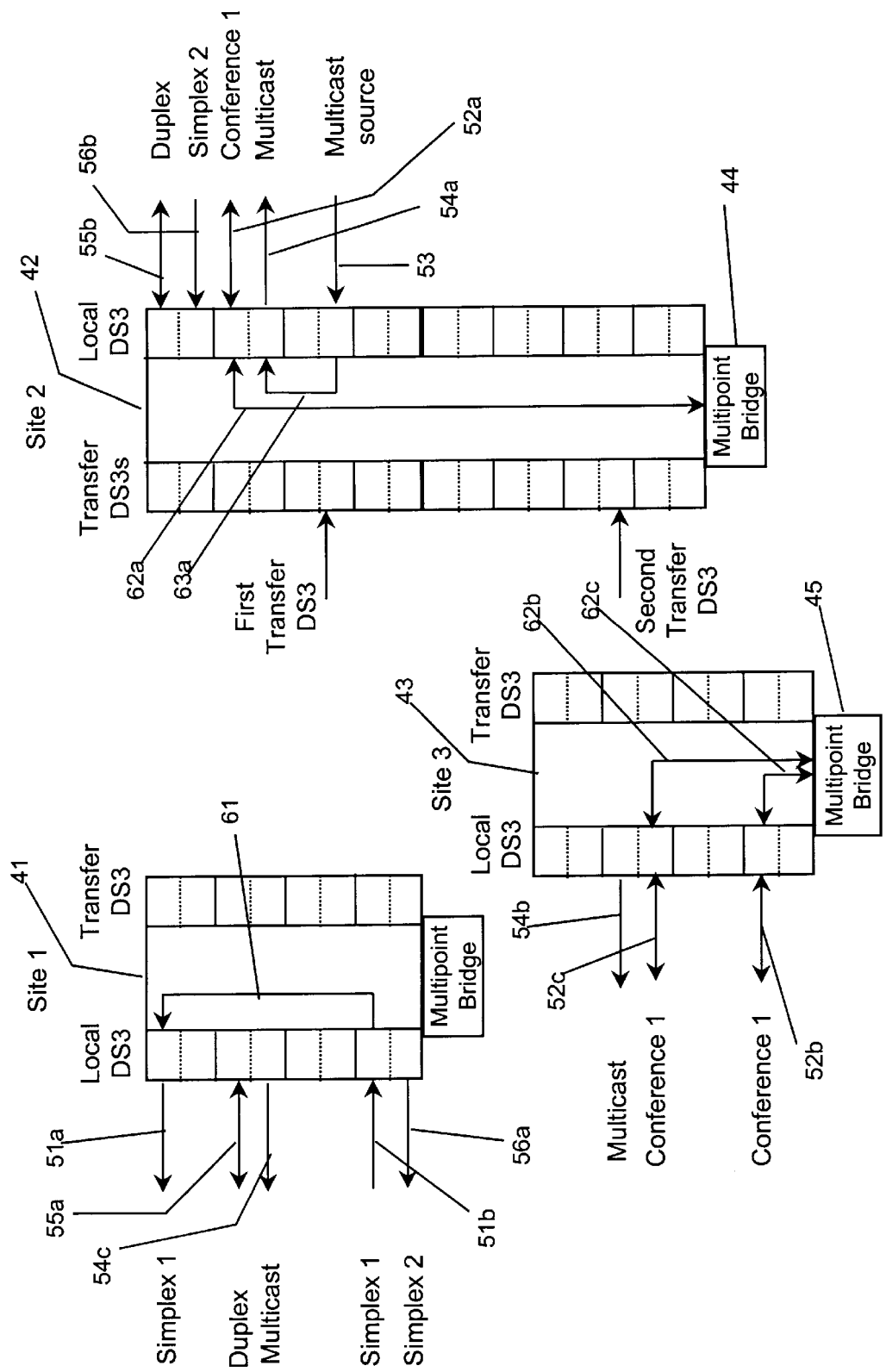
FIG. 4 shows the local connections from step 4 of the invention.

The method of the invention proceeds from the first site onward, and the connections are shown on FIG. 4. The figure for Site 1 shows the DCS 1/0 machine at Site 1 (16) in schematic form. The column labeled "Local DS3" represents ports on the machine belonging to its DS3. Note that one DS3 is shown, but there could be many. The solid blocks represent DS1 signals within that DS3, with the first at the top, as in FIG. 3. The dotted lines represent the DS0 signals within the DS1 signals. The DS3 labeled "Transfer DS3" is another DS3 port with DS1 and DS0 signals shown as for the local one. The use of this port is explained below. The block labeled "MP Bridge" is a special processor in the machine used to make conference calls.

Site 1 (41) has the first simplex connection (51a) to (51b), and this connection (shown as (35a) in FIG. 3) is made with link (61) as shown.

On the Site 2 machine (42), the first conference leg (52a) is connected to the Multipoint Bridge (44) by link (62a). The multicast connection (63a) is made from the multicast source (53) to multicast receiver (54a).

On the site 3 machine (43) the second (52b) and third (52c) legs of the conference are made to the Multipoint Bridge (45) by connections (62b) and (62c) respectively.

This concludes the local connections, and the method moves on to the next step (95).

Construct DCS 1/0 Output (95)

DS3 signals off the main diagonal (3) represent cross-connections between machines at different locations. These are made in order, starting from the first Site.

Figure 5:
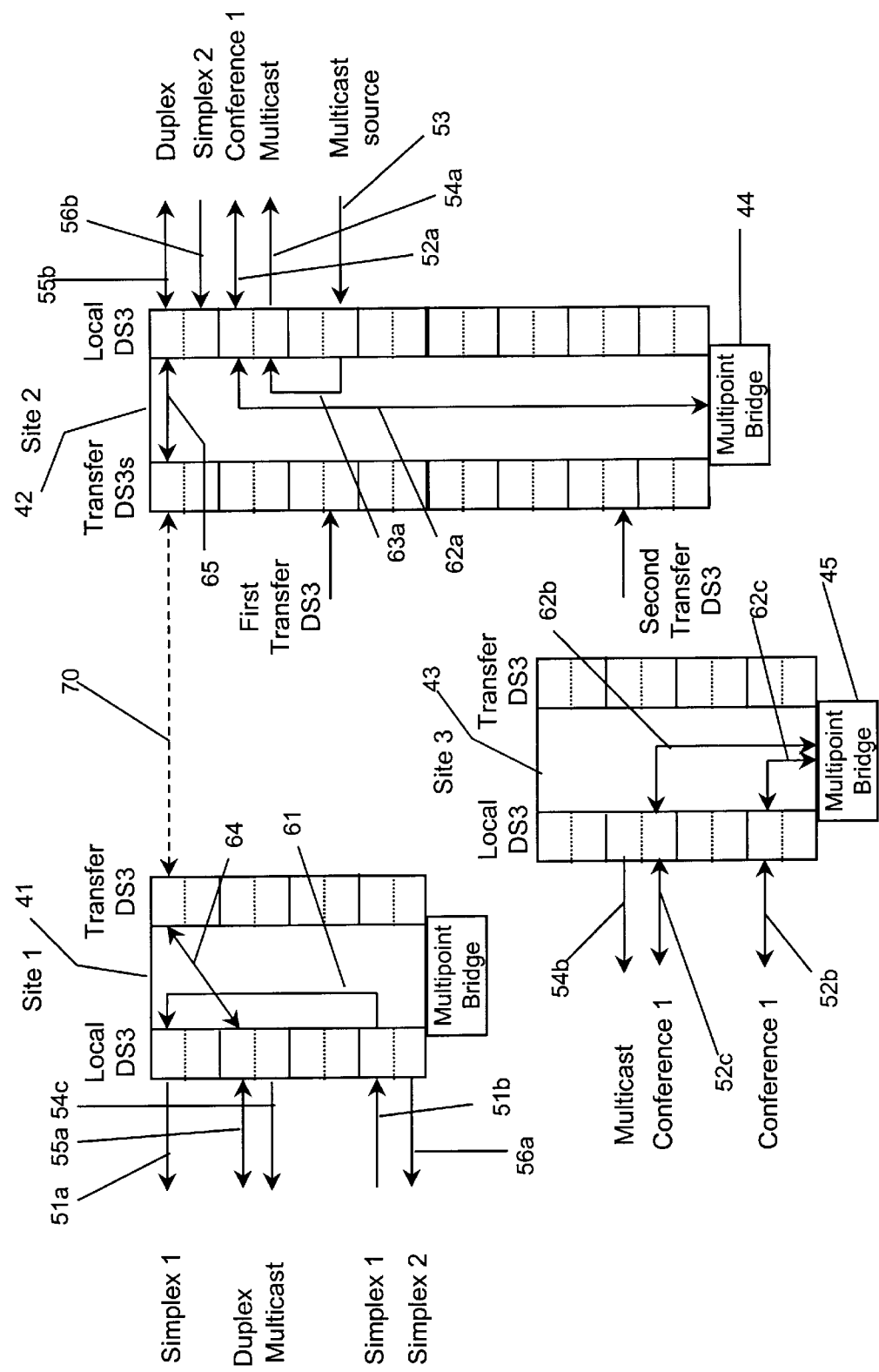
FIG. 5 shows the connections from site 1 to site 2 from step 5 of the invention.

FIG. 5 shows the connections being made from site 1 to site 2.

On FIG. 3, the first block after the local connections with a connection is for Site 2, and it is the duplex connection (35b–c). Duplex connections may carry voice, and voice is sensitive to delay between the two halves of the conversation. For this reason, duplex connections should use the two directions of transmission available on the same DS0. Therefore, for this method, a connection must be first checked to see if it is duplex, and if so, both sides of the transmission are handled at the same time.

The duplex connection is between two different machines, so the first side of the duplex connection is taken to a DS0 on a DS1 that is specifically used to transfer signals between machines, as shown in FIG. 5. In this particular design, shown on FIG. 2, the DCS 1/0 machines connect only to DS3 signals, so DS3 signal ports must be allocated on each machine for this function. Transfer ports are dedicated for specific machines. For example, when transfers are needed between machines 1 and 2, a specific port on each machine is dedicated for these transfers. Transfers between machines 1 and 3 or 2 and 3 must use another port. The size of the port (DS1, DS3, etc.) must be the same on each machine, and the connections on each port for the same circuit must match.

The source (55a) for Side 1 of the duplex connection (35b) is on the Site 1 machine, so a duplex connection is made from the source which is the first DS0 on the second DS1 to the first DS0 on the first DS1 of the first DS0 port for signal transfers. The DS0 signals for transfer are simply used in the order that they are available. The first transfer DS3 (81a) on the DCS 1/0 at Site 1 (41) is then assigned to the first available transfer DS3 (82a) on the machine at Site 2 (42). The method by which signals from the transfer ports are connected between machines will be discussed later. A duplex connection (65) from the transfer DS3 on the machine (42) at Site 2 is then made to the destination port (55b) on the DCS 1/0 at Site 2.

This completes all the connections from site 1 to site 2, so we move on to connections from site 2.

Figure 6:
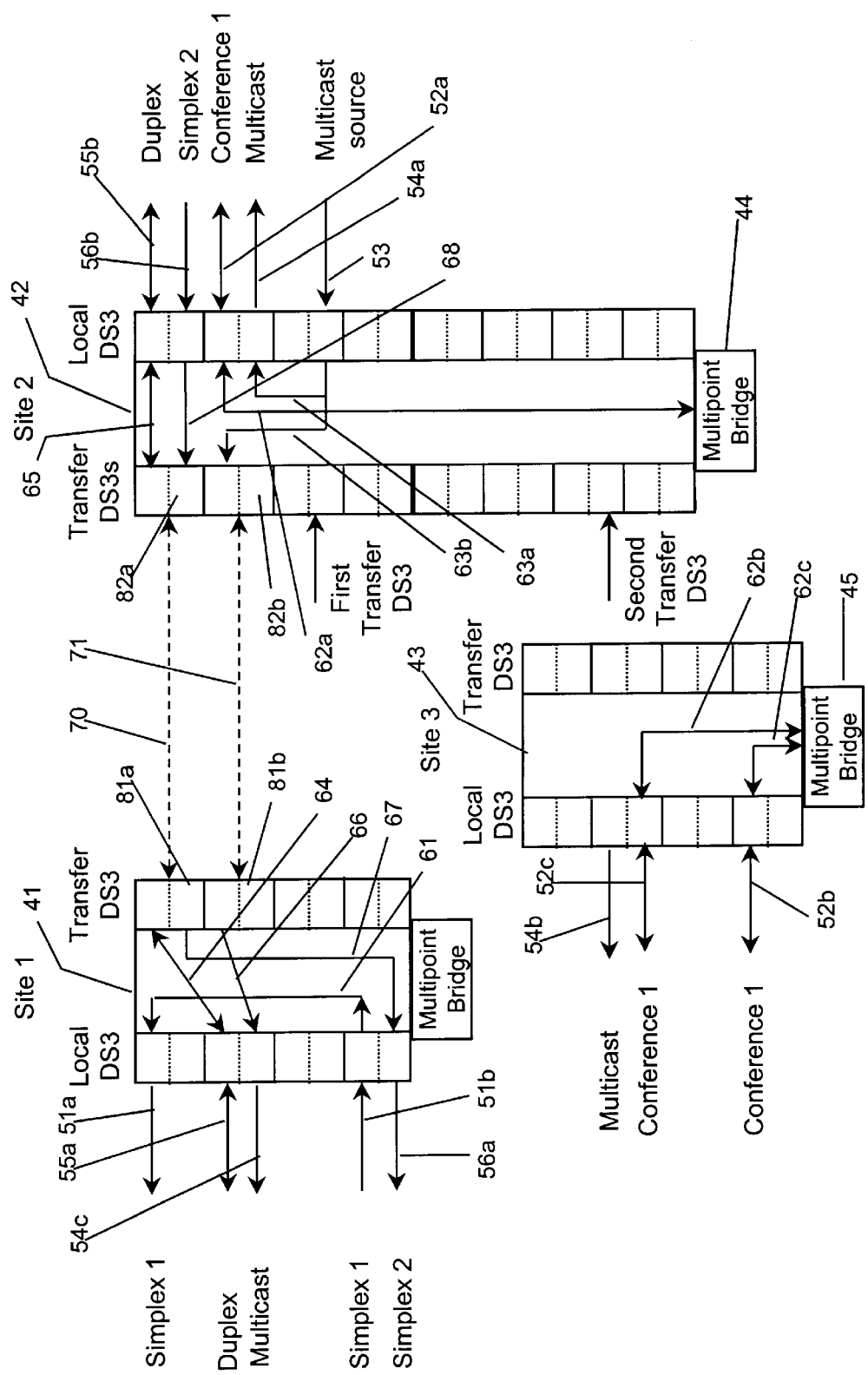
FIG. 6 shows the connections from site 2 to site 1 from step 5 of the invention.

FIG. 6 shows the connections for Site 2 as source to Site 1 as destination, the next block to be considered. Side 2 of the duplex connection (55a) to (SSb) has already been done with side 1, via link (64)-(81a)-(70)-(82a)-(65). The connection between transfer ports (70) is shown at the dividing line between the two DS0 signals to indicate both are being carried over the line. This avoids drawing two lines, one for each DS0, and reduces the number of lines on the drawing.

The second simplex connection (56a) to (56b) must be taken from its port on the DCS 1/0 (42) at Site 2 to the next available DS0 on a DS3 bound for Site 1. In this case, that DS0 is the second DS0 on the DS1 that was already used for the duplex connection (81a). This selection also determines the location of the connection at Site 1, so the transfer DS0 can now be connected to the port on the Site 1 DCS 1/0 via link (67).

The second leg of the multicast connection (53) on site 2 (42) to (54c) on site 1 (41), is made via link (63b) to transfer DS3 (82b) on site 2 (42), then via (71) to transfer DS3 (81b) on site 1 (41). In site 1 (41), link (66) then connects DS3 (81b) to multicast receiver (54c).

This ends the Site 2 (42) to Site 1 (41) connections, and we move on to connections from site 2 to site 3. Transfers between sites 2 and 3 require another transfer port on the site 2 machine, as mentioned previously. This transfer DS3 is shown below the one used for site 1/site 2 communication.

Figure 7:
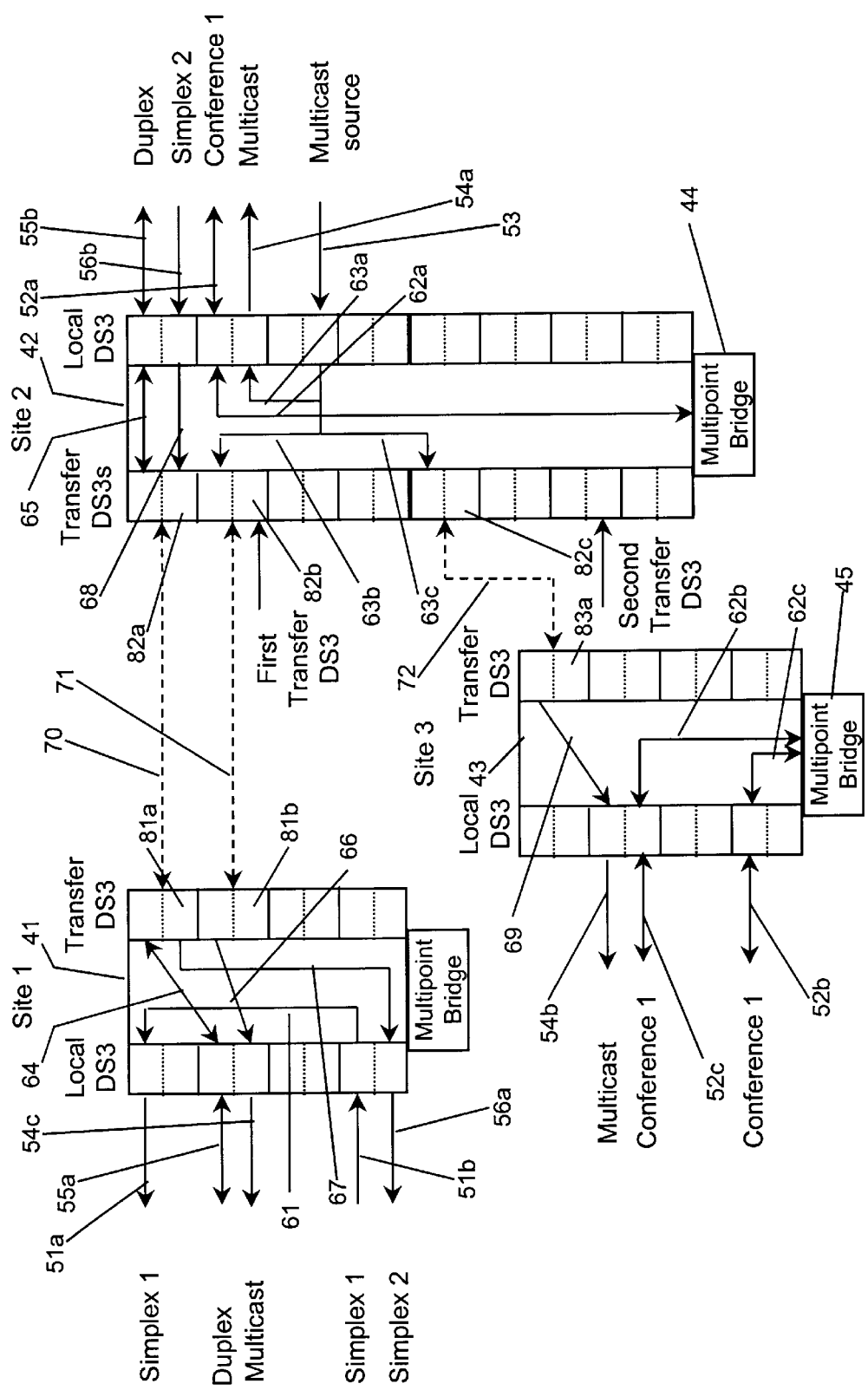
FIG. 7 shows the connections from site 2 to site 3 from step 5 of the invention.

The first connection from Site 2 (42) to Site 3 (43), as shown in FIG. 7, is the remainder of the multicast connection, from multicast source (53) to multicast receiver (54b). This is made through connection (63c) from the source (53) to transfer DS3 (82c), then via link (72) to transfer DS3 (83a) on site 3 (43)

Figure 8:
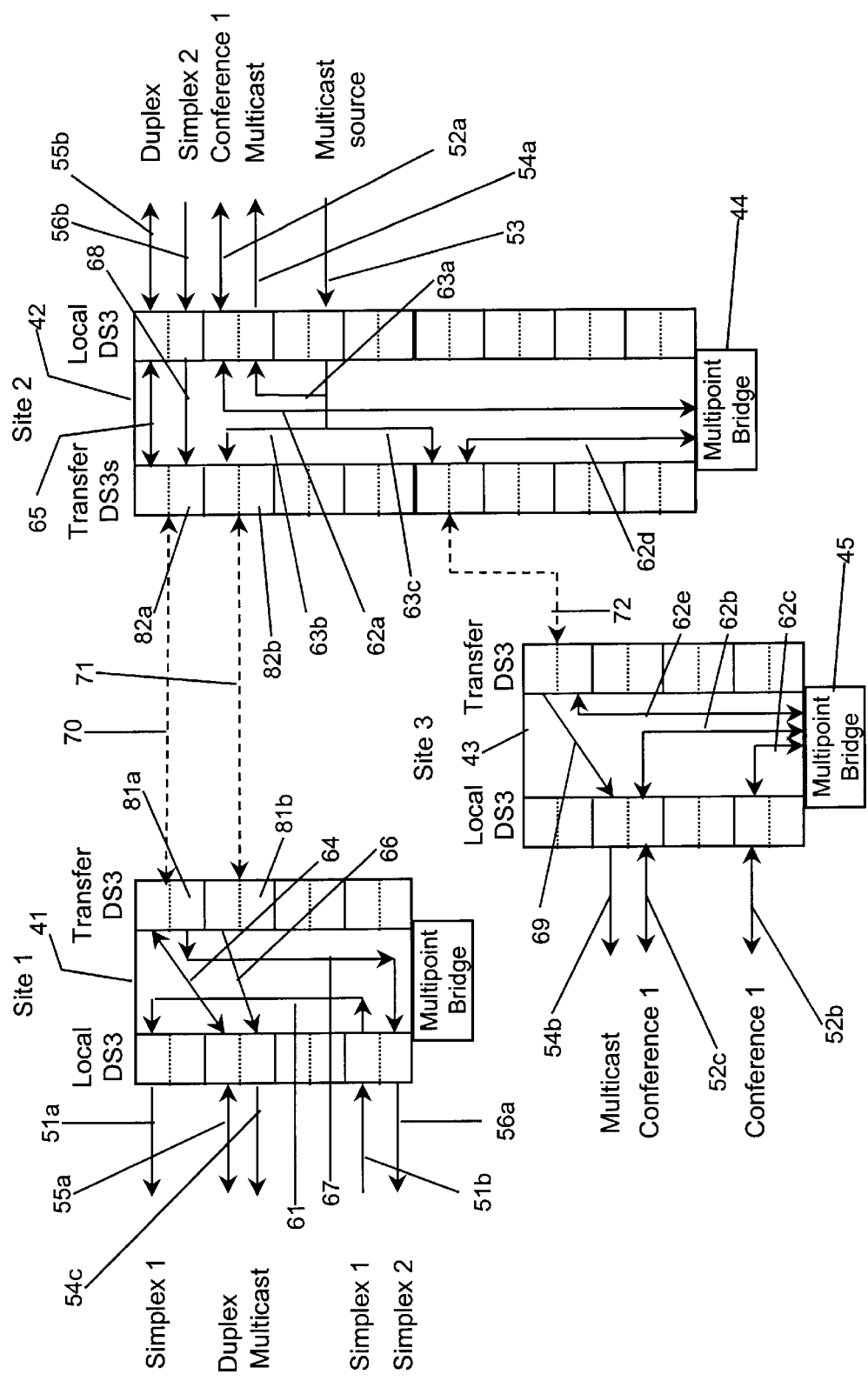
FIG. 8 shows the connections between sites for a conference interconnect from step 5 of the invention.

As shown in FIG. 8, the conference call represents a special case, since a connection must be made between the Site 2 (42) and Site 3 (43) machines which is not shown on an off-diagonal block on the matrix in FIG. 3.

For this method, as soon as a conference call is encountered the remaining main diagonal blocks must be searched for additional legs for that conference. In this case, two additional legs (52b) and (52c), corresponding to (36c) and (36b) in FIG. 3, are found at Site 3, and a connection (62d) to a transfer DS3 (82c) is made, just as in the case of the connections between Sites 1 and 2. This transfer DS3 (82c) is linked (72) to transfer DS3 (83a) on site 3 machine (43), and then (62e) to the multipoint bridge (45), which completes the conference connection C1.

Interconnection of DS1 signals between sites follows the same pattern as for DS0 signals. DS3 signals also follow the same pattern. Notice that besides DCS machines, the method also accommodates multiplexers which perform cross-connects internally, such as SONET multiplexers. The set up is the same as for the DCS. For example, the construction of the range matrix in FIG. 3 is the same, except that the source or destination DS1 signals are separate entities, and not part of a DS3. In accord with this, the transfer ports would be a combination of DS1 and DS3 ports.

Transmission Between Machines (96)

This method separates the interconnections required within cross-connects from the connections required between cross-connects. Therefore, the interconnection of transfer signals (DS3 in this particular embodiment) between machines may use any method desired. Several algorithms that are part of common practice may be used for this purpose.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method of operating a multiplex communications network having at least one main site and a plurality of breakout sites; the at least one main site comprising switching means for cross-connecting signals from the network; each breakout site comprising a plurality of local connections each carrying communications signals of a plurality of signal types, each communications signal being intended for interconnection with another local connection on the same or a different breakout site, and a multiplexer for combining a plurality of communications signals into a plurality of higher-order signals for transmission over the network to the at least one main site; the network comprising a plurality of multiplex communications channels connecting the at least one main site and the breakout sites, comprising at least a higher-order carrier, the higher order carrier being capable of multiplexing a predefined number of signals, the method comprising the steps of:

at each breakout site, combining each of the communications signals into a higher-order signal and transmitting the higher-order signal to the at least one main site;

at the at least one main site:
connecting the higher-order signals to the switching means;
grooming the communications signals from the higher-order signals from the breakout sites, such that the fewest possible number of higher-order signals connected to the switching means contain the communications signals;
making entries characterizing the desired switching of the communications signals in a two-dimensional matrix, one dimension of the matrix representing signal sources at the at least one main site, and the second dimension representing signal destinations at the at least one main site, an entry at an intersection of a signal source and signal destination representing a desired connection between the source and the destination, each communications signal being assigned at least one entry in the matrix depending upon the signal type of the communications signal, each of said entries being either on a diagonal of the matrix or off a diagonal of the matrix;
reviewing the entries on the diagonal of the matrix which represent a connection between a signal source and a signal destination which are on the same site, and making the connection between the signal source and the signal destination on the site;
reviewing the off-diagonal entries in the matrix along the dimension representing signal sources for a selected main site, and for each entry in the matrix which represents a connection between a signal source on the selected site and a signal destination on a second site, making a connection from the selected site to a transfer higher-order signal being routed to the second site, and also a connection on the second site from the transfer higher-order signal to the signal destination; and
repeating the last step until each of the main sites on the signal source dimension has been done.

2. The method of claim 1, in which one of the plurality of signal types is a simplex connection, and the entry on the matrix representing the simplex connection comprises a single entry at the intersection of the dimension representing the signal source and the dimension representing the signal destination.

3. The method of claim 1, in which one of the plurality of signal types is a duplex connection between two locations having two sides, and the matrix contains an entry for each side of the duplex connection at the intersection of the dimension representing the signal source and the dimension representing the signal destination.

4. The method of claim 1, in which one of the plurality of signal types is a multicast connection having a single source and a plurality of destinations, and the matrix contains a plurality of entries along the dimension representing the signal source, at each point of intersection of the dimension representing the plurality of signal destinations.

5. The method of claim 1, in which one of the plurality of signal types is a conference connection having a plurality of local connections comprising bi-directional communications signals from a plurality of locations connected together; the matrix contains a conference entry along the diagonal thereof for each location of the conference at the intersection of the dimension representing the signal source and the same location on the dimension representing the signal destination; and each main site further comprises a multipoint bridge for connecting a plurality of signals, the method further comprising the steps of:

reviewing the matrix for conference communications;
for each conference communication found:
reviewing the entries on the diagonal of the matrix for each main site;
on a main site having an entry on the diagonal for the found conference connection, making a connection between the signal source represented by the entry on the source dimension and a multipoint bridge on the site;
if a previous entry on another site has been found for the same conference, making a connection between the multipoint bridge to a transfer higher-order signal routed to the previous main site; and
repeating the last two steps until each of the plurality of main sites on the source dimension has been reviewed for connections to the found conference; and
repeating the preceding group of steps until each of the plurality of main sites on the source dimension has been reviewed and all conferences have been connected.

6. The method of claim 1, in which the multiplex signals on the network are time-division multiplexed signals.

7. The method of claim 6, in which the higher-order signals at the breakout sites are DS3 signals.

8. The method of claim 7 in which a plurality of higher-order signals are multiplexed into network-level signals at each breakout site for communication over the network to the main sites.

9. The method of claim 8 in which the network-level signals are OC-48 signals.

10. The method of claim 8, further comprising the step of grooming the higher-order signals such that the fewest possible number of network-level signals connected to the network contain the higher-order signals.

11. The method of claim 6 in which the communications signals from the local connections are DS0 signals.

12. The method of claim 1, further comprising the step of creating the two-dimensional matrix from the network design.

13. The method of claim 12, in which the step of creating the two-dimensional matrix comprises the steps of:

selecting a main site;

providing a row and a column for each available higher-order signal on the switching means at the site; and repeating the last two steps until all main sites on the network have been added to the matrix.

* * * * *